Patented Jan. 24, 1928.

1,657,147

UNITED STATES PATENT OFFICE.

FLORENCE H. BRAINARD, OF LONE ROCK, WISCONSIN.

VARNISH AND PAINT REMOVING COMPOUND.

No Drawing.   Application filed March 1, 1923.   Serial No. 622,227.

My invention relates to a composition of matter for removing paint, varnish, stain, filler or other similar coatings from wood, metal or other surfaces and to the process of making the same.

The object of this invention is to provide a more efficient composition of this kind which can be economically manufactured, which does not evaporate rapidly or deteriorate through exposure to the air, which will adhere to surfaces in any position, which will not injure or discolor the hands and which may be stored or handled without danger.

The composition of my invention comprises water, a non-caustic alkali, an acid and sodium silicate or other suitable starchy or gelatinous organic substance.

In preparing the compound, I proceed for example as follows:

Two pounds of carbonate of soda are dissolved in ten quarts of water and allowed to stand twelve hours after which one ounce of citric acid is added and when effervescing has ceased seven quarts of liquid or soluble glass such as sodium or a similar silicate are added and the whole thoroughly mixed. No heat is to be employed in the preparation.

The resultant compound is then ready for use and may be applied to the surface to be treated with a brush or cloth or in any other suitable manner. The surface may be preliminarily dampened to expedite the action of the compound, but this is not essential. After the remover has stood until the paint or varnish on the surface has been absorbed it is washed or wiped off, leaving the surface in its original state, clean, uncolored and unaffected either by the coating or by the remover.

The compound if covered will keep indefinitely without deterioration due to the presence of citric acid or citrate. Because of the absence of causticity since sodium carbonate is used in place of caustic alkali it will be found not to be harsh or injurious to the hands. Due to its adhesive characteristics resulting from the use of the silicate it is possible to treat all of the sides of an article at once, thus greatly reducing the time heretofore required to remove coatings in this fashion.

While I have specified in the foregoing example what I consider to be the preferred ingredients, proportions and method of preparation, I do not thereby intend to suggest that the invention is limited to precise details as obviously the advantages pointed out may be attained in other and various ways, all within the contemplation of the invention as set forth in the following claims.

Sodium citrate, for which can be substituted any other organic acid salts such as tartrate, mucate, lactate and benzoate, has the effect of preventing deterioration of the sodium silicate upon standing, this deterioration being principally due to the thickening and gelatinization of the silicate. It can be said that the citric acid or the citrate or other similar organic salts act in a manner as thinning agents and make the solution more workable. The sodium carbonate is for the purpose of adding a non-caustic alkalinity to the solution of the paint remover, but it is obvious that any other alkaline material, for example the tri-sodium phosphate, sodium borate, potassium carbonate, etc. could also be used. All these compounds have sufficient alkalinity to be effective in the paint remover, but are insufficiently alkaline to be harsh or injurious to the hands. It will be noted from the above specification that the varnish and paint removing compound is composed of a non-caustic alkaline material in solution with a silicate or a similar gelatinous material, which will enable a paint remover to be applied to vertical surfaces, and at the same time a stabilizer such as a citrate or other organic salt is added to maintain the silicate in permanently workable condition and of constant consistency.

I claim:

1. A compound for removing paint, varnish or similar coatings, consisting of a mixture of water, a noncaustic alkali and sodium silicate to which has been added an alkali metal citrate as a stabilizer.

2. A compound for removing paint, varnish or similar coatings, consisting of a mixture of 10 quarts of water, 2 pounds of sodium carbonate and 7 quarts of sodium silicate, to which has been added one ounce of citric acid.

3. A compound for removing paint, varnish or similar coatings, consisting of water, non-caustic alkali, sodium, silicate, and an organic salt as a stabilizer for the sodium silicate.

4. A compound for removing paint, varnish, or similar coatings, consisting of a mixture of water, alkali metal carbonate, alkali metal citrate and sodium silicate.

In testimony whereof I have hereunto subscribed my name.

FLORENCE H. BRAINARD

CERTIFICATE OF CORRECTION.

Patent No. 1,657,147.  Granted January 24, 1928, to

FLORENCE H. BRAINARD.

It is hereby certified that error appears in the printed specification of the above numbered patent requiring correction as follows: Page 2, line 15, claim 4, strike out the word "sodium" and insert instead "alkali metal"; and that the said Letters Patent should be read with this correction therein that the same may conform to the record of the case in the Patent Office.

Signed and sealed this 27th day of March, A. D. 1928.

Seal.

M. J. Moore,
Acting Commissioner of Patents.